Jan. 17, 1967 E. M. WHITE ET AL 3,298,126
ALARM FOR FISHING LINE
Filed Nov. 27, 1964
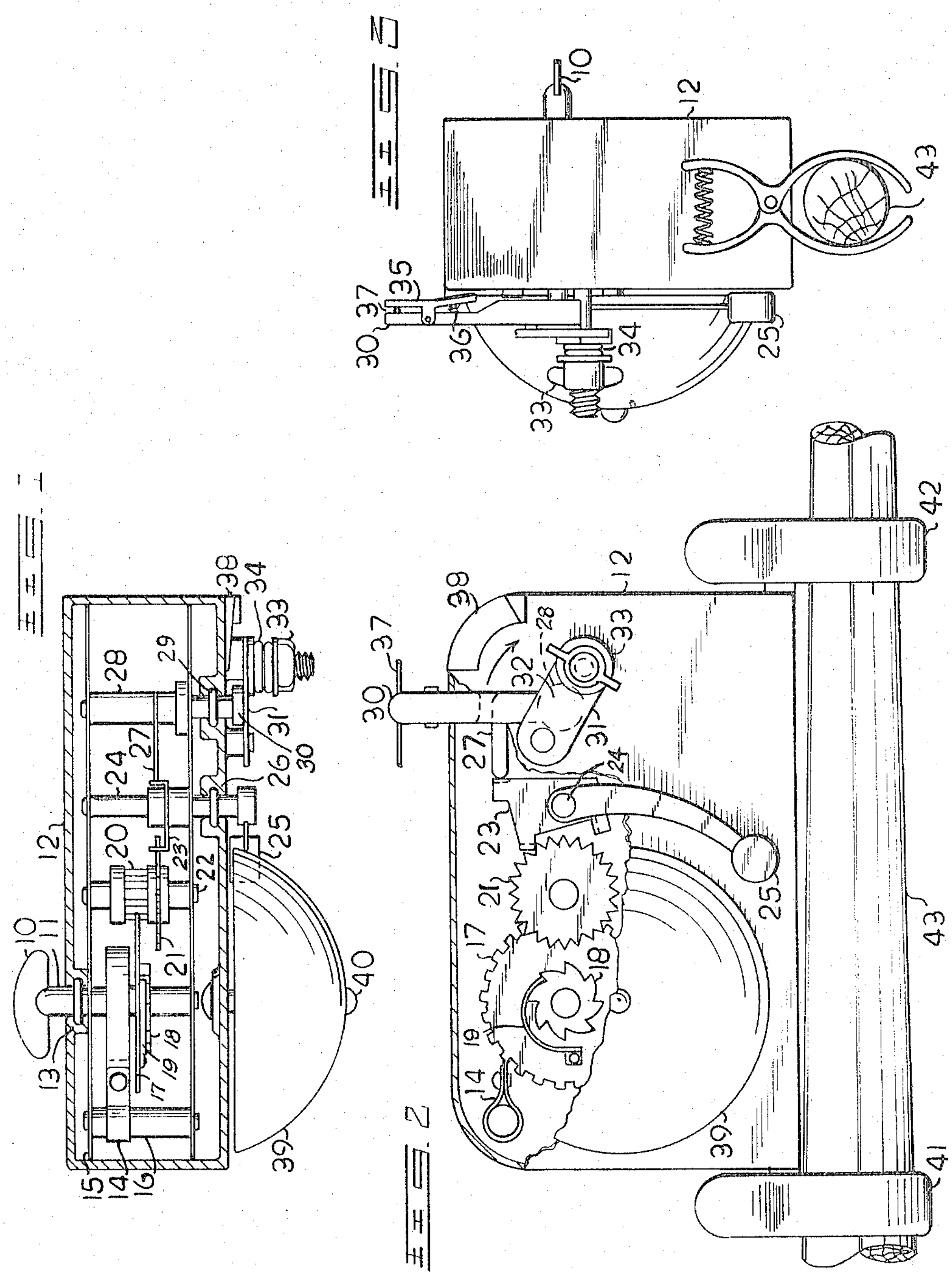
INVENTORS
EDMUND M. WHITE
CECIL T. RHOADES United States Patent Office 3,298,126

Patented Jan. 17, 1967

3,298,126

ALARM FOR FISHING LINE

Edmund M. White, Lot 84, 1500 3rd St., Chula Vista, Calif. 92010, and Cecil T. Rhoades, 4961 Easy St., Riverside, Calif. 92505

Filed Nov. 27, 1964, Ser. No. 414,306
2 Claims. (Cl. 43—17)

My invention generally relates to a signal alarm for fish lines and more particularly to a signal alarm that will automatically sound when a fish is caught on a fish line.

An object of the invention is to provide a device as described that may be attached temporarily to a fishing pole or to another nearby suitable object that is spring wound for power, that the main working parts are sealed against moisture or water, that will automatically sound an alarm, unattended and continue to sound an alarm when a fish is caught on a line until the pre-wound power spring runs down.

These, together with other objects and advantages which will become apparent, reside in the details of construction and operation as will be more fully described and claimed, reference being made to the accompanying drawing forming a part hereof, wherein like numerals refer to like parts throughout, and in which:

FIGURE 1 is a top plan view, partially in cross section of the invention.

FIGURE 2 is a side elevational view showing a portion of the fish pole and with a portion of the housing broken away to show key parts within.

FIGURE 3 is a front elevational view.

Referring specifically to the drawing, there is a spring winding key 10 outside a water-resistant housing 12, FIGURE 1. This key 10 is secured to a rotatable shaft 11 and extends through housing 12 and is sealed for moisture and water by O ring and gland 13. A coil spring 14 is secured by its inner end to shaft 11. The coiled spring 14 is anchored by its outer end to anchor pin 16. Anchor pin 16 in turn is secured to frame 15.

The rotatable shaft 11 passes through spur gear 17 and is secured to the ratchet wheel 18 so that it must rotate with it. A curved spring 19 is attached to the spur gear 17 and rotates with it. The spur gear 17 is in mesh with smaller gear 20, FIGURE 1. This small gear 20 and the escapement gear 21, FIGURES 1 and 2, are both secured to shaft 22 and rotate together.

The escapement member 23 is secured to bell clapper shaft 24. This shaft extends through the wall of housing 12 to the bell clapper 25. The bell clapper 25 is also secured to and rotates with the bell clapper shaft 24. It will be noted that there is an O ring seal and gland 26 provided, FIGURE 1, around the bell clapper shaft 24.

A stop arm 27 is secured to and rotates with shaft 28. An O ring and gland seal 29 is provided through the housing wall. Arm 30 is also secured to and rotates with shaft 28. An adjustable friction clutch plate 31 is in contact with a round flat end surface 32 of the arm 30.

This friction clutch is provided with a wing nut 33 and a coil spring 34.

A pincher type jaw 35, FIGURE 3, has a small coil spring 36 prestressed to hold the fish line 37 from slipping.

An inclined and curved surface 38 is provided at the outside corner of the housing 12.

A bell 39 is supported outside of housing 12 by a single rivet 40. Two spring tension clips 41 and 42, FIGURES 2 and 3 (omitted FIGURE 1), are mounted to each end of the housing 12.

In operation:

The invention is mounted on the fish pole or other object so that the fish line 37 passes through and is gripped by the jaws 30–35 of the fish line gripping arm 30. The fish line 37 extends on to the end of the line baited and in the water.

The winding key 10 is rotated to wind the coiled power spring 14.

The gear train and bell clapper are held motionless by the stop arm 27 forcing the escapement member 23 into the teeth of escapement gear 21 as shown in FIGURE 2.

When a fish strikes the baited line the fish line gripping arm 30 is caused to rotate about its axis in the direction of the arrow, FIGURE 2. Stop arm 27 being secured to and rotatable with shaft 28 relieves escapement member 23. Clapper 25 is thus caused to strike bell 39 by the kinetic energy passing from coiled spring 14 through the gear train to the escapement device to the bell clapper.

The bell continues to ring until the spring runs out of energy.

The fish line gripping arm 30 rotates as indicated by arrow, FIGURE 2, until the inside surface of the jaw 35, below the fulcrum, is caused to move inwardly against the spring 36, against the inclined surface 38, thus releasing the fish line 37 and leaving it free for landing the caught fish.

The friction clutch 31 of the fish line gripping arm, is adjusted by the wing nut 33, according to the amount of force required to pull the fish line.

It will be clear that the embodiment of the invention may be used in many ways as well as changed. Such changes will not affect the essence of the invention as described in the annexed claims.

What is claimed as new is as follows:

1. In a signal alarm for fishing lines, in combination, a water-resistant housing, spring clips on said housing for attaching said housing to a fishing pole, a coil spring within said housing, a key extending outside said housing for winding said coil spring, a gear train within said housing and powered by said coil spring, an alarm within said housing, an escapement device within said housing and driven by said gear train and having a hammer for striking said alarm, a lever arm pivoted within said housing and having a free end portion extending outside said housing, said lever arm having a stop element for blocking said escapement device, the free end of said lever arm having a fishing line gripping pincher clamp, said pincher clamp comprising a movable clamp arm spring-urged to clamp a fishing line in said pincher clamp, whereby when a fish pulls on the fishing line, said lever arm is rotated to move said stop element to unblock said escapement device to cause said hammer to sound the alarm, said housing having a fixed inclined cam surface on the exterior portion thereof and in the path of said movable clamp arm to disengage the fishing line from said pincher clamp when said lever arm moves through a predetermined distance by the fish pulling on the fishing line whereby the fishing line is automatically released and is free for landing the fish.

2. In a signal alarm for fishing lines of the type described in claim 1 and further characterized by an adjustable spring-tensioned brake means engaging said lever arm for adjusting the amount of force necessary for a fish to pull on the fishing line to rotate said lever arm to initiate the sounding of said alarm.

References Cited by the Examiner

UNITED STATES PATENTS

| | | | |
|---|---|---|---|
| 253,090 | 1/1882 | Ohaver et al. | 43—17 X |
| 2,749,649 | 6/1956 | Fitzsimmons | 43—43.12 |
| 2,986,835 | 6/1961 | Ordinetz et al. | 43—17 |
| 2,995,853 | 8/1961 | Ohliger | 43—17 |

FOREIGN PATENTS

| | | |
|---|---|---|
| 997,669 | 9/1951 | France. |
| 861,104 | 2/1961 | Great Britain. |
| 588,664 | 2/1959 | Italy. |

SAMUEL KOREN, *Primary Examiner.*

D. J. LEACH, *Asistant Examiner.*